United States Patent
Liu et al.

(10) Patent No.: US 11,226,986 B2
(45) Date of Patent: Jan. 18, 2022

(54) DATA TABLE PARTITIONING MANAGEMENT METHOD AND APPARATUS

(71) Applicant: HUAWEI TECHNOLOGIES CO., LTD., Shenzhen (CN)

(72) Inventors: Zhe Liu, Hangzhou (CN); Ke Shen, Hangzhou (CN); Tieying Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 389 days.

(21) Appl. No.: 15/853,952

(22) Filed: Dec. 25, 2017

(65) Prior Publication Data
US 2018/0121532 A1 May 3, 2018

Related U.S. Application Data

(63) Continuation of application No. PCT/CN2015/082513, filed on Jun. 26, 2015.

(51) Int. Cl.
*G06F 16/27* (2019.01)
*G06F 16/25* (2019.01)
*G06F 16/22* (2019.01)

(52) U.S. Cl.
CPC .......... *G06F 16/278* (2019.01); *G06F 16/221* (2019.01); *G06F 16/2282* (2019.01); *G06F 16/25* (2019.01)

(58) Field of Classification Search
CPC .. G06F 16/278; G06F 16/221; G06F 16/2282; G06F 16/25; G06F 16/2255;
(Continued)

(56) References Cited

U.S. PATENT DOCUMENTS 7,035,851 B1 * 4/2006 Sinclair ............... G06F 16/2282
7,680,761 B2 3/2010 Zait et al.
(Continued)

FOREIGN PATENT DOCUMENTS

CN 101120340 A 2/2008
CN 103440245 A 12/2013
(Continued)

OTHER PUBLICATIONS

Vishal Sikka et al. Efficient Transaction Processing in SAP HANA Database—The End of a Column Store Myth, SIGMOD '12, May 20-24, 2012, pp. 731-741.
(Continued)

*Primary Examiner* — Angelica Ruiz
(74) *Attorney, Agent, or Firm* — Maier & Maier, PLLC

(57) ABSTRACT

A data table partitioning management method and apparatus are disclosed. The method includes: determining a type and a join key of each data table in a table group, where the type of the data table includes a one-dimensional table, a multi-dimensional table, or a fact table; and performing one-dimensional partitioning on row replica space of each data table in the table group, and performing one-dimensional or multidimensional partitioning on column replica space of the data table according to the type of the data table and based on the join key of the data table. Different partitioning management methods are applied to data tables of different types and different dimensions, so that data processing mechanisms of OLTP and OLAP are efficiently implemented in a system, and resource consumption is reduced.

18 Claims, 9 Drawing Sheets

(58) Field of Classification Search
CPC ............... G06F 16/27; G06F 16/24544; G06F 16/2456; G06F 3/065; G06F 3/0647
USPC ........................................................ 707/802
See application file for complete search history.

(56) References Cited

U.S. PATENT DOCUMENTS

| | | | | |
|---|---|---|---|---|
| 7,818,349 | B2* | 10/2010 | Frost | ................. G06F 16/24532 707/802 |
| 2005/0038784 | A1 | 2/2005 | Zait et al. | |
| 2005/0187977 | A1 | 8/2005 | Frost | |
| 2008/0281784 | A1 | 11/2008 | Zane et al. | |
| 2011/0157194 | A1* | 6/2011 | Eisenbach | ............ H04N 19/423 345/522 |
| 2012/0143873 | A1* | 6/2012 | Saadat | ................. G06F 16/2228 707/741 |
| 2012/0179723 | A1 | 7/2012 | Lin et al. | |
| 2013/0073513 | A1 | 3/2013 | Kemper et al. | |
| 2016/0335319 | A1* | 11/2016 | Teodorescu | ....... G06F 16/24575 |

FOREIGN PATENT DOCUMENTS

| | | | |
|---|---|---|---|
| CN | 103942342 | A | 7/2014 |
| CN | 103210671 | B | 2/2016 |

OTHER PUBLICATIONS

Ravishankar Ramamurthy et al. A Case for Fractured Mirrors. Proceedings of the 28th VLDB Conference, total 12 pages.

\* cited by examiner

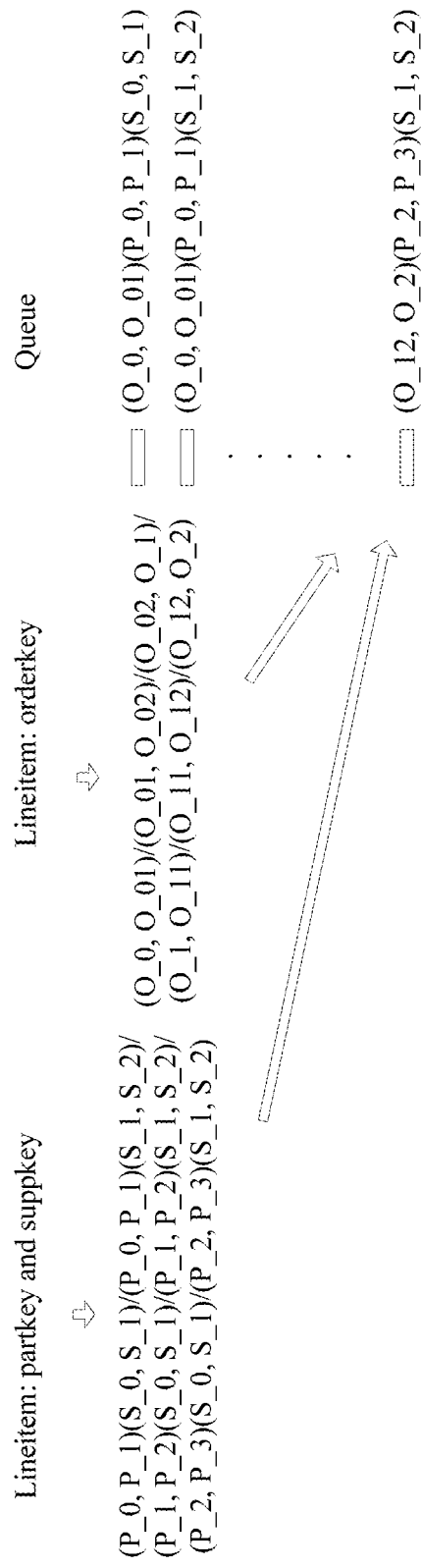

DATA TABLE PARTITIONING MANAGEMENT METHOD AND APPARATUS

CROSS-REFERENCE TO RELATED APPLICATIONS

This application is a continuation of International Application No. PCT/CN2015/082513, filed on Jun. 26, 2015, the disclosure of which is hereby incorporated by reference in its entirety.

TECHNICAL FIELD

The present disclosure relates to the field of database technologies, and in particular, to a data table partitioning management method and apparatus.

BACKGROUND

With development of information-based technologies, a database needs to have not only high data storage efficiency but also a latest data source for data analysis, so that a provided conclusion has a reference value. Therefore, as shown in FIG. 1, a new system is formed by combining online transaction processing (OLTP) and online analytical processing (OLAP). The system is a hybrid storage database applied to OLTP and OLAP, and supports functions of both column storage and row storage. Therefore, the system has good read and write performance. In OLTP, input data may be processed and a response may be made in a timely manner. In OLAP, a complex analysis operation may be performed, decision support is mainly focused, and an intuitive query result that can be readily understood is provided. In this new system, how to ensure operation real-time performance of OLTP and analysis efficiency and effectiveness of OLAP is very important.

First existing technical solution: As shown in FIG. 2, a storage system backs up data first, and then stores backup data in multiple corresponding physical disks. In decomposition storage model (DSM), data is stored in a column storage manner, and in N-ary storage mode (NSM), data is stored in a row storage manner. In addition, an OLAP request may be routed to a column replica for execution, and an OLTP request may be routed to a row replica for execution. However, in this solution, different types of queries are processed separately by using different replicas. Particularly, in an operation of joining multiple tables, a computing amount is large and high data network transmission overheads are consumed.

Second existing technical solution: A database system is internally divided into two subsystems to store system data. For each piece of data, at least one replica is stored in each of the two subsystems. One subsystem stores the data into a non-column storage structure, and the other subsystem stores the data into a column storage structure. Different types of query services are routed to different subsystems for processing. For example, a data operation of addition, deletion, or modification is routed to a non-column storage subsystem for processing, and a column storage subsystem regularly requires data synchronization with the non-column storage subsystem. However, the two subsystems are independent of each other. Therefore, both hardware configuration and system maintenance require high overheads.

In a database system, how to ensure operation real-time performance of OLTP and implement analysis efficiency and effectiveness of OLAP is a problem that needs to be resolved.

SUMMARY

The present disclosure provides a data table partitioning management method and apparatus, to apply different partitioning management methods to data tables of different types and different dimensions. Therefore, data processing mechanisms of OLTP and OLAP can be efficiently implemented in a system, and resource consumption can be reduced.

A first aspect of the embodiments of the present invention provides a data table partitioning management method, where a table group includes a fact table and at least one one-dimensional table, the fact table is not a table having any dimension in the table group, each dimensional table is a dimensional table associated with the fact table, a field that associates each dimensional table with the fact table is used as a join key between the fact table and the dimensional table, and the method includes:

determining a type and a join key of each data table in the table group, where the type of the data table includes a one-dimensional dimensional table, a multidimensional dimensional table, or a fact table; and performing one-dimensional partitioning on row replica space of each data table in the table group, and performing one-dimensional or multidimensional partitioning on column replica space of the data table according to the type of the data table and based on the join key of the data table.

With reference to the first aspect, in a first possible implementation manner of the first aspect, the performing one-dimensional partitioning on row replica space of each data table in the table group, and performing one-dimensional or multidimensional partitioning on column replica space of the data table according to the type of the data table and based on the join key of the data table includes:

when the data table is a one-dimensional dimensional table, respectively performing one-dimensional partitioning on column replica space and row replica space of the one-dimensional dimensional table based on a single join key of the one-dimensional dimensional table, to obtain a one-dimensional column replica partition and a one-dimensional row replica partition of the one-dimensional dimensional table.

With reference to the first possible implementation manner of the first aspect, in a second possible implementation manner of the first aspect, the performing one-dimensional partitioning on row replica space of each data table in the table group, and performing one-dimensional or multidimensional partitioning on column replica space of the data table according to the type of the data table and based on the join key of the data table includes:

when the data table is a multidimensional dimensional table, obtaining a one-dimensional column replica partition and a one-dimensional row replica partition that correspond to each of multiple join keys of the multidimensional dimensional table; and combining multiple one-dimensional column replica partitions corresponding to the multiple join keys, to obtain a multidimensional column replica partition of the multidimensional dimensional table, and selecting a one-dimensional row replica partition corresponding to one of the multiple join keys as a one-dimensional row replica partition of the multidimensional dimensional table.

With reference to the first or the second possible implementation manner of the first aspect, in a third possible implementation manner of the first aspect, the performing one-dimensional partitioning on row replica space of each data table in the table group, and performing one-dimensional or multidimensional partitioning on column replica space of the data table according to the type of the data table and based on the join key of the data table includes:

when the data table is a fact table, obtaining a one-dimensional column replica partition of a one-dimensional dimensional table that is associated with the fact table and/or a multidimensional column replica partition of a multidimensional dimensional table that is associated with the fact table;

selecting another field other than the join key from the fact table as a partition key, and performing one-dimensional partitioning on column replica space and a row replica space of the fact table based on the partition key, to obtain a one-dimensional column replica partition and a one-dimensional row replica partition;

obtaining a multidimensional column replica partition of the fact table by means of combination according to the one-dimensional column replica partition corresponding to the partition key, and the one-dimensional column replica partition of the one-dimensional dimensional table that is associated with the fact table and/or the multidimensional column replica partition of the multidimensional dimensional table that is associated with the fact table; and performing one-dimensional partitioning on the one-dimensional row replica partition corresponding to the partition key, to obtain a one-dimensional row replica partition of the fact table.

With reference to the second possible implementation manner of the first aspect, in a fourth possible implementation manner of the first aspect, the obtaining a one-dimensional column replica partition and a one-dimensional row replica partition that correspond to each of multiple join keys of the multidimensional dimensional table includes:

when a one-dimensional dimensional table associated with the multidimensional dimensional table exists in the table group, obtaining a one-dimensional column replica partition and a one-dimensional row replica partition that correspond to a single join key of each associated one-dimensional dimensional table; or when no one-dimensional dimensional table associated with the multidimensional dimensional table exists in the table group, respectively performing one-dimensional partitioning on column replica space and row replica space of the multidimensional dimensional table based on each of the multiple join keys of the multidimensional dimensional table, to obtain the one-dimensional column replica partition and the one-dimensional row replica partition that correspond to each of the join keys.

With reference to the first aspect, in a fifth possible implementation manner of the first aspect, after the performing one-dimensional partitioning on row replica space of each data table in the table group, and performing one-dimensional or multidimensional partitioning on column replica space of the data table according to the type of the data table and based on the join key of the data table, the method further includes:

creating a synchronization queue according to an obtained one-dimensional row replica partition of the data table or an obtained one-dimensional or multidimensional column replica partition of the data table; and synchronizing each data table in the table group at a master node to a slave node according to the synchronization queue.

With reference to the fifth possible implementation manner of the first aspect, in a sixth possible implementation manner of the first aspect, the creating a synchronization queue according to an obtained one-dimensional row replica partition of the data table or an obtained one-dimensional or multidimensional column replica partition of the data table includes:

when the data table is a one-dimensional dimensional table, creating a one-dimensional synchronization queue according to a one-dimensional row replica partition or a one-dimensional column replica partition of the one-dimensional dimensional table.

With reference to the fifth possible implementation manner of the first aspect, in a seventh possible implementation manner of the first aspect, the creating a synchronization queue according to an obtained one-dimensional row replica partition of the data table or an obtained one-dimensional or multidimensional column replica partition of the data table includes:

when the data table is a multidimensional dimensional table, creating a multidimensional synchronization queue according to a multidimensional column replica partition of the multidimensional dimensional table.

With reference to the fifth possible implementation manner of the first aspect, in an eighth possible implementation manner of the first aspect, the creating a synchronization queue according to an obtained one-dimensional row replica partition of the data table or an obtained one-dimensional or multidimensional column replica partition of the data table includes:

when the data table is a fact table, creating a multidimensional synchronization queue according to a one-dimensional column replica partition of a one-dimensional dimensional table that is associated with the fact table and/or a multidimensional column replica partition of a multidimensional dimensional table that is associated with the fact table, and a one-dimensional row replica partition of the fact table.

With reference to any one of the fifth to the eighth possible implementation manners of the first aspect, in a ninth possible implementation manner of the first aspect, the master node includes a master node of a one-dimensional row replica, and the synchronizing each data table in the table group at a master node to a slave node according to the synchronization queue includes:

sending, by using the master node of the one-dimensional row replica, each data table in the table group to the slave node for synchronization.

A second aspect of the embodiments of the present invention provides a data table partitioning management apparatus, where a table group includes a fact table and at least one one-dimensional table, the fact table is not a table having any dimension in the table group, each dimensional table is a dimensional table associated with the fact table, a field that associates each dimensional table with the fact table is used as a join key between the fact table and the dimensional table, and the apparatus includes:

a determining module, configured to determine a type and a join key of each data table in the table group, where the type of the data table includes a one-dimensional dimensional table, a multidimensional dimensional table, or a fact table; and a partitioning module, configured to: perform one-dimensional partitioning on row replica space of each data table in the table group, and perform one-dimensional and/or multidimensional partitioning on column replica space of the data table according to the type of the data table and based on the join key of the data table.

With reference to the second aspect, in a first possible implementation manner of the second aspect, the partitioning module is configured to:

when the data table is a one-dimensional dimensional table, respectively perform one-dimensional partitioning on column replica space and row replica space of the one-dimensional dimensional table based on a single join key of the one-dimensional dimensional table, to obtain a one-dimensional column replica partition and a one-dimensional row replica partition of the one-dimensional dimensional table.

With reference to the first possible implementation manner of the second aspect, in a second possible implementation manner of the second aspect, the partitioning module is configured to:

when the data table is a multidimensional dimensional table, obtain a one-dimensional column replica partition and a one-dimensional row replica partition that correspond to each of multiple join keys of the multidimensional dimensional table; and combine the multiple one-dimensional column replica partitions corresponding to the multiple join keys, to obtain a multidimensional column replica partition of the multidimensional dimensional table, and select a one-dimensional row replica partition corresponding to one of the multiple join keys as a one-dimensional row replica partition of the multidimensional dimensional table.

With reference to the first or the second possible implementation manner of the second aspect, in a third possible implementation manner of the second aspect, the partitioning module is configured to:

when the data table is a fact table, obtain a one-dimensional column replica partition of a one-dimensional dimensional table that is associated with the fact table and/or a multidimensional column replica partition of a multidimensional dimensional table that is associated with the fact table;

select another field other than the join key from the fact table as a partition key, and perform one-dimensional partitioning on column replica space and a row replica space of the fact table based on the partition key, to obtain a one-dimensional column replica partition and a one-dimensional row replica partition;

obtain a multidimensional column replica partition of the fact table by means of combination according to the one-dimensional column replica partition corresponding to the partition key, and the one-dimensional column replica partition of the one-dimensional dimensional table that is associated with the fact table and/or the multidimensional column replica partition of the multidimensional dimensional table that is associated with the fact table; and perform one-dimensional partitioning on the one-dimensional row replica partition corresponding to the partition key, to obtain a one-dimensional row replica partition of the fact table.

With reference to the second possible implementation manner of the second aspect, in a fourth possible implementation manner of the second aspect, the partitioning module is configured to:

when a one-dimensional dimensional table associated with the multidimensional dimensional table exists in the table group, obtain a one-dimensional column replica partition and a one-dimensional row replica partition that correspond to a single join key of each associated one-dimensional dimensional table; or when no one-dimensional dimensional table associated with the multidimensional dimensional table exists in the table group, respectively perform one-dimensional partitioning on column replica space and row replica space of the multidimensional dimensional table based on each of the multiple join keys of the multidimensional dimensional table, to obtain the one-dimensional column replica partition and the one-dimensional row replica partition that correspond to each of the join keys.

With reference to the second aspect, in a fifth possible implementation manner of the second aspect, the apparatus further includes:

a creation module, configured to create a synchronization queue according to an obtained one-dimensional row replica partition of the data table or an obtained one-dimensional or multidimensional column replica partition of the data table; and a synchronization module, configured to synchronize each data table in the table group at a master node to a slave node according to the synchronization queue.

With reference to the fifth possible implementation manner of the second aspect, in a sixth possible implementation manner of the second aspect, the creation module is specifically configured to:

when the data table is a one-dimensional dimensional table, create a one-dimensional synchronization queue according to a one-dimensional row replica partition or a one-dimensional column replica partition of the one-dimensional dimensional table.

With reference to the fifth possible implementation manner of the second aspect, in a seventh possible implementation manner of the second aspect, the creation module is configured to:

when the data table is a multidimensional dimensional table, create a multidimensional synchronization queue according to a multidimensional column replica partition of the multidimensional dimensional table.

With reference to the fifth possible implementation manner of the second aspect, in an eighth possible implementation manner of the second aspect, the creation module is configured to:

when the data table is a fact table, create a multidimensional synchronization queue according to a one-dimensional column replica partition of a one-dimensional dimensional table that is associated with the fact table and/or a multidimensional column replica partition of a multidimensional dimensional table that is associated with the fact table, and a one-dimensional row replica partition of the fact table.

With reference to the fifth to the eighth possible implementation manners of the second aspect, in a ninth possible implementation manner of the second aspect, the master node includes a master node of a one-dimensional row replica, and the synchronization module is configured to:

send, by using the master node of the one-dimensional row replica, each data table in the table group to the slave node for synchronization.

A third aspect of the embodiments of the present invention provides a data table partitioning management apparatus, where a table group includes one fact table and at least one one-dimensional table, the fact table is not a table having any dimension in the table group, each dimensional table is a dimensional table associated with the fact table, a field that associates each dimensional table with the fact table is used as a join key between the fact table and the dimensional table, and the apparatus includes a network interface, a memory, and a processor, where the memory stores a set of program code, and the processor is configured to call the program code stored in the memory, so that the apparatus executes the method according to the foregoing implementation manners.

By means of implementation of the embodiments of the present invention, a type and a join key of each data table in a table group are first determined, where the type of the data table includes a one-dimensional dimensional table, a multidimensional dimensional table, or a fact table; and then one-dimensional partitioning is performed on row replica space of each data table in the table group, and one-dimensional or multidimensional partitioning is performed on column replica space of the data table according to the type of the data table and based on the join key of the data table. Therefore, different partitioning management methods are applied to data tables of different types and different dimensions, so that data processing mechanisms of OLTP and OLAP are efficiently implemented in a system, and resource consumption is reduced.

BRIEF DESCRIPTION OF DRAWINGS

To describe the technical solutions in the embodiments of the present invention more clearly, the following briefly describes the accompanying drawings required for describing the embodiments. The accompanying drawings in the following description show merely some embodiments of the present invention, and a person of ordinary skill in the art may still derive other drawings from these accompanying drawings without creative efforts.

FIG. 7C is a schematic diagram of creating a synchronization queue of a fact table according to an embodiment of the present invention;

DESCRIPTION OF EMBODIMENTS

The following clearly describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present disclosure.

Figure 1:
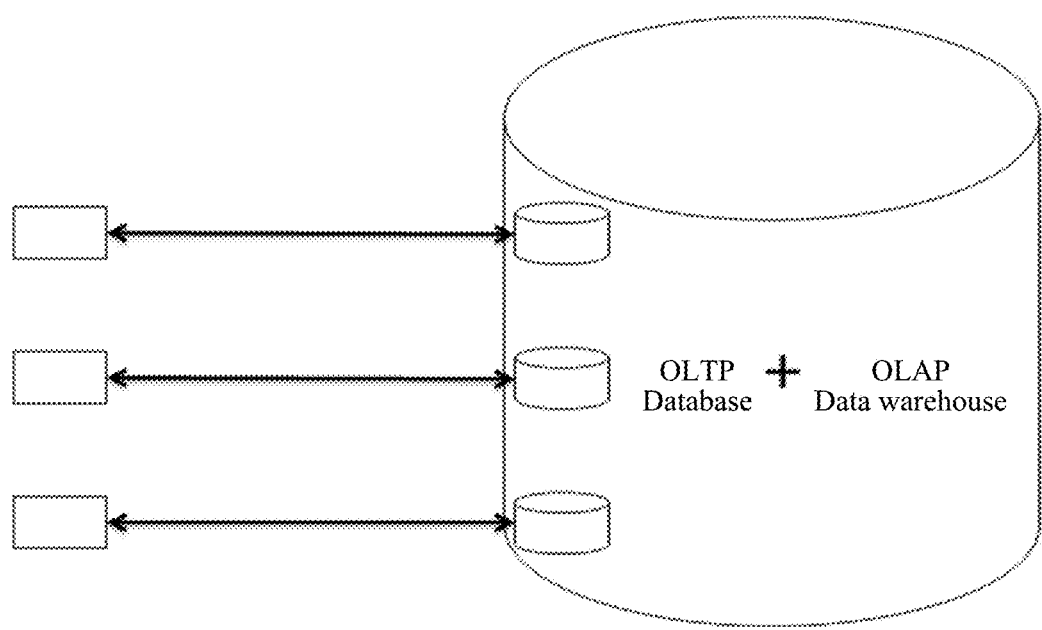
FIG. 1 is a schematic structural diagram of a database according to an existing technical solution of the present disclosure.
Figure 2:
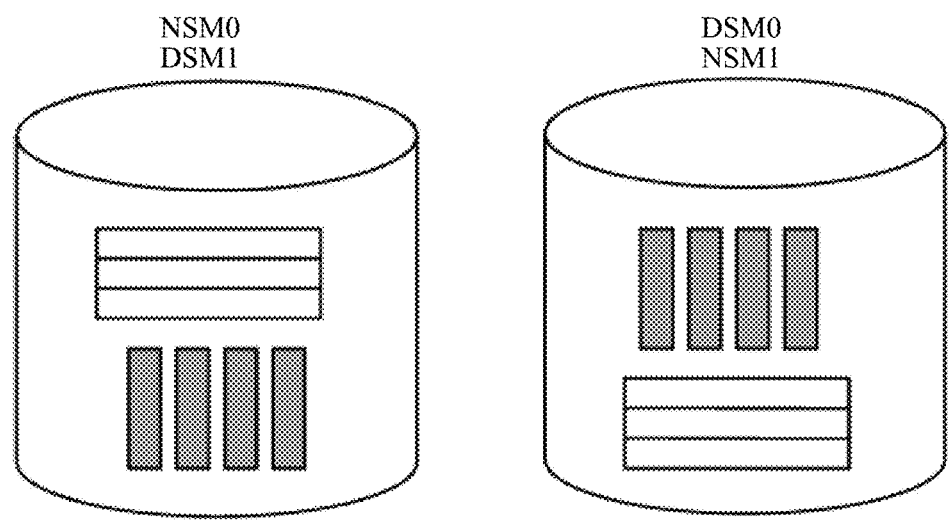
FIG. 2 is a schematic structural diagram of data storage according to an existing technical solution of the present disclosure.
Figure 3:
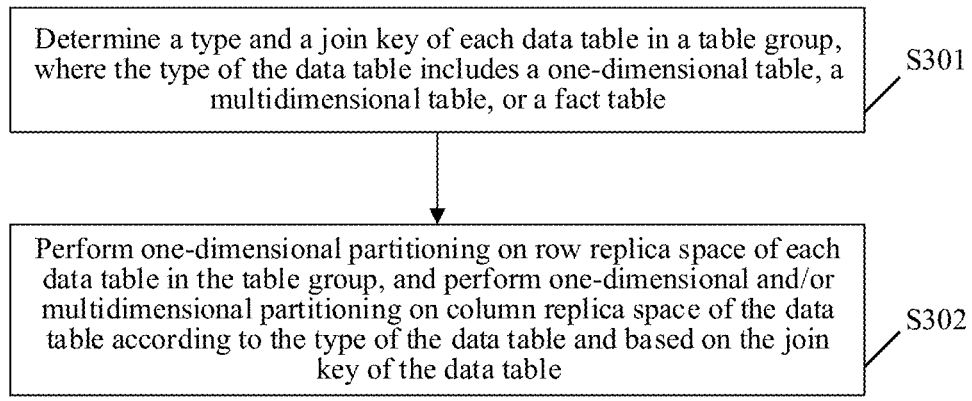
FIG. 3 is a schematic flowchart of a data table partitioning management method according to a first embodiment of the present invention.

Referring to FIG. 3, FIG. 3 is a schematic flowchart of a data table partitioning management method according to a first embodiment of the present invention. This embodiment of the present invention may be executed by a management node in a database cluster. As shown in the figure, the method in this embodiment of the present invention includes the following steps.

S301: Determine a type and a join key of each data table in a table group, where the type of the data table includes a one-dimensional dimensional table, a multidimensional dimensional table, or a fact table.

In an implementation, a table group includes one fact table and at least one one-dimensional table, the fact table is not a table having any dimension in the table group, each dimensional table is a dimensional table associated with the fact table, and a field that associates each dimensional table with the fact table is used as a join key between the fact table and the dimensional table. In a service scenario of managing multiple tables in a distributed database, tables stored in the database may be classified into a fact table or a dimensional table according to stored content. The fact table is an intersection of multiple dimensional tables, includes data describing a particular event in a service (for example, a bank transaction or product sale), and is used to store at least one fact record. Each fact record corresponds to a row in the fact table. One fact table may be associated with multiple dimensional tables, and the dimensional tables are used to analyze a fact. An entry in the dimensional table is used to describe data in the fact table, and records a dimensional attribute of the fact record in the fact table. For example, product sales may be analyzed according to a product type or a sale time. Therefore, a product dimensional table and a time dimensional table may be created first, and the product dimensional table and the time dimensional table are respectively aggregated into one table, to obtain a fact table. The fact table may include a product type, a sale time, a sale volume, or the like. In this embodiment, the fact table in the table group is associated with each dimensional table in the table group. A key connecting two data tables is generally referred to as a join key, and the fact table is associated with the dimensional table by using the join key.

Figure 4A:
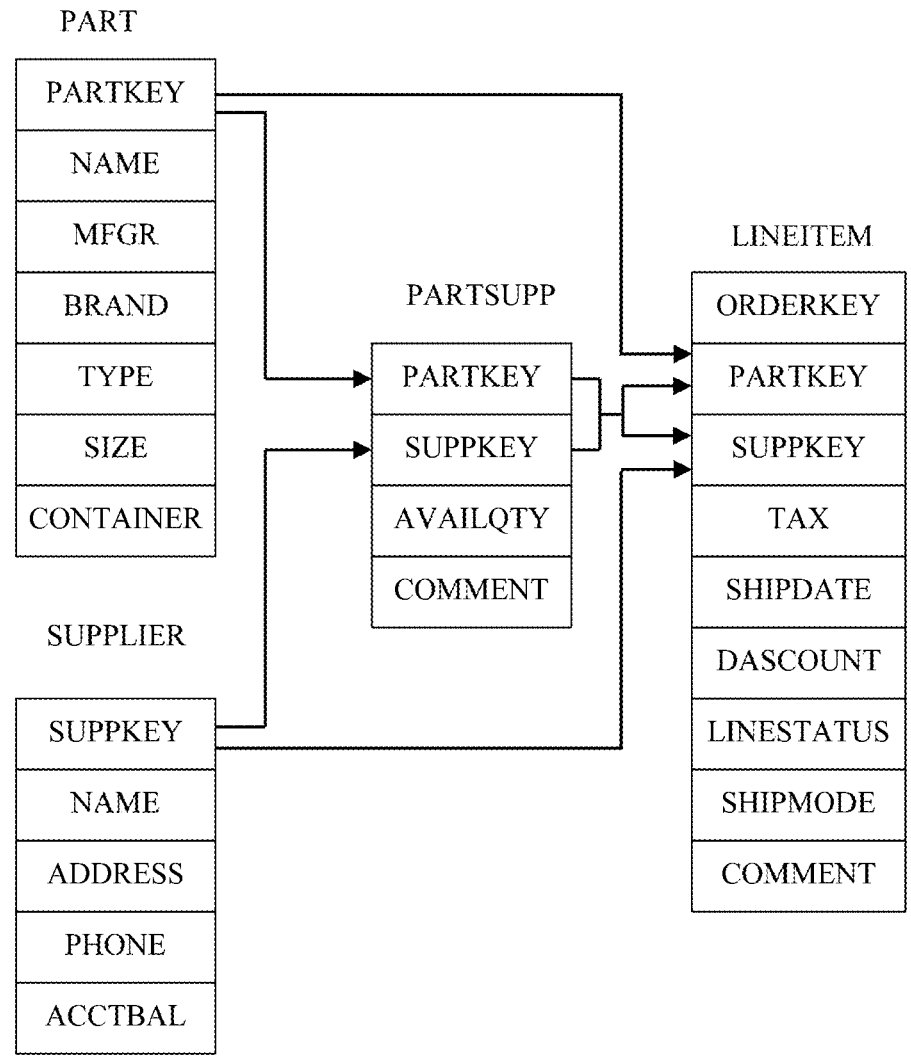
FIG. 4A is a schematic structural diagram of a table group according to an embodiment of the present invention.

As shown in FIG. 4A, a table group includes a dimensional table PART, a dimensional table SUPPLIER, a dimensional table PARTSUPP, and a fact table LINEITEM. The dimensional table PART, the dimensional table SUPPLIER, and the dimensional table PARTSUPP all are dimensional tables associated with the fact table LINEITEM. The dimensional table PART is associated with the dimensional table PARTSUPP and the fact table LINEITEM by using a join key PARTKEY. The dimensional table SUPPLIER is associated with the dimensional table PARTSUPP and the fact table LINEITEM by using a join key SUPPKEY. The dimensional table PART and the dimensional table SUPPLIER are both associated with the fact table by using only one join key, and are referred to as a one-dimensional dimensional table. The dimensional table PARTSUPP is associated with the fact table LINEITEM by using the join key PARTKEY and the join key SUPPKEY. Therefore, the dimensional table PARTSUPP is referred to as a two-dimensional dimensional table. It should be noted that a dimensional table in a table group includes, but is not limited to a one-dimensional dimensional table or a two-dimensional dimensional table, and may further include a three-dimensional dimensional table, a four-dimensional dimensional table, or the like.

S302: Perform one-dimensional partitioning on row replica space of each data table in the table group, and perform one-dimensional and/or multidimensional partitioning on column replica space of the data table according to the type of the data table and based on the join key of the data table.

In an implementation, when the data table is a one-dimensional table, one-dimensional partitioning is respectively performed on column replica space and row replica space of the one-dimensional table based on a single join key of the one-dimensional table, to obtain a one-dimensional column replica partition and a one-dimensional row replica partition of the one-dimensional dimensional table. An interval range of a one-dimensional row replica partition of a dimensional table is consistent with an interval range of a one-dimensional column replica partition of the dimensional table. Further, a quantity of nodes between row replica partitions may be selected according to a data volume, and a partition interval of each column replica partition is used as a logical node.

Figure 5A:
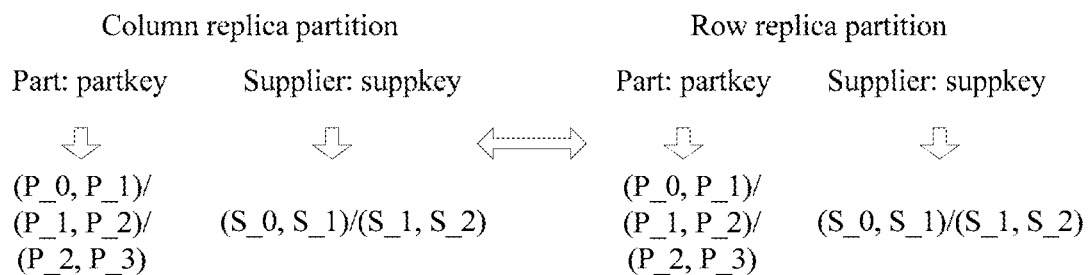
FIG. 5A is a schematic diagram of partitions of a one-dimensional dimensional table according to an embodiment of the present invention.

For example, as shown in FIG. 4A and FIG. 5A, a dimensional table PART and a dimensional table SUPPLIER are a one-dimensional table, a join key of the dimensional table PART is PARTKEY, and a join key of the dimensional table SUPPLIER is SUPPKEY. Therefore, one-dimensional partitioning is performed on the dimensional table PART based on the join key PARTKEY, to obtain both a one-dimensional row replica partition and a one-dimensional column replica partition of the dimensional table PART: (P_0, P_1)/(P_1, P_2)/(P_2, P_3). Similarly, one-dimensional partitioning is performed on the dimensional table SUPPLIER based on the join key SUPPKEY, to obtain both a one-dimensional row replica partition and a one-dimensional column replica partition of the dimensional table SUPPLIER: (S_0, S_1)/(S_1, S_2).

When the data table is a multidimensional table, a one-dimensional column replica partition and a one-dimensional row replica partition that correspond to each of multiple join keys of the multidimensional dimensional table are obtained. The multiple one-dimensional column replica partitions corresponding to the multiple join keys are combined, to obtain a multidimensional column replica partition of the multidimensional dimensional table. A one-dimensional row replica partition corresponding to one of the multiple join keys is selected as a one-dimensional row replica partition of the multidimensional dimensional table.

Further, when a one-dimensional table associated with the multidimensional table exists in the table group, a one-dimensional column replica partition and a one-dimensional row replica partition that correspond to a single join key of each associated one-dimensional table are obtained. Alternatively, when no one-dimensional table associated with the multidimensional table exists in the table group, one-dimensional portioning is respectively performed on column replica space and row replica space of the multidimensional table based on each of the multiple join keys of the multidimensional table, to obtain the one-dimensional column replica partition and the one-dimensional row replica partition that correspond to each of the join keys.

Figure 4B:
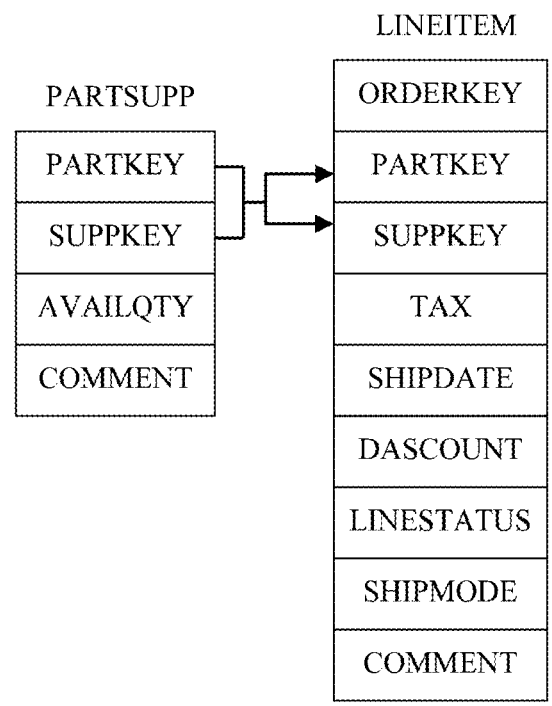
FIG. 4B is a schematic structural diagram of another table group according to an embodiment of the present invention.
Figure 5B:
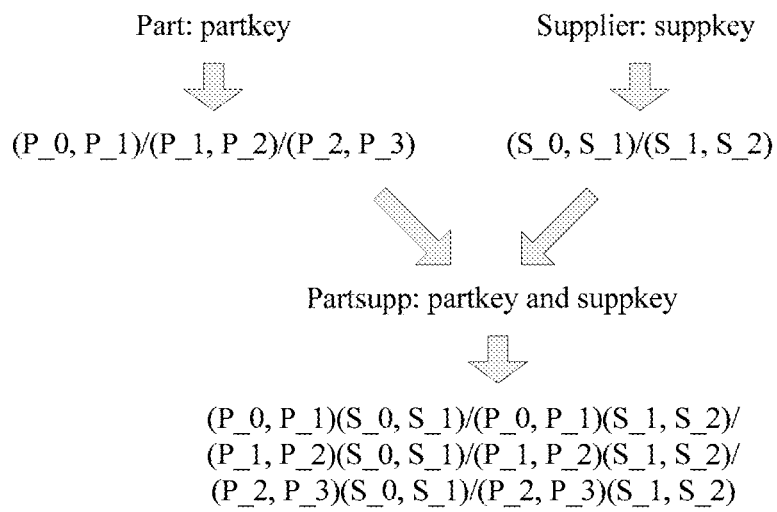
FIG. 5B is a schematic diagram of partitions of a multidimensional dimensional table according to an embodiment of the present invention.
Figure 5C:
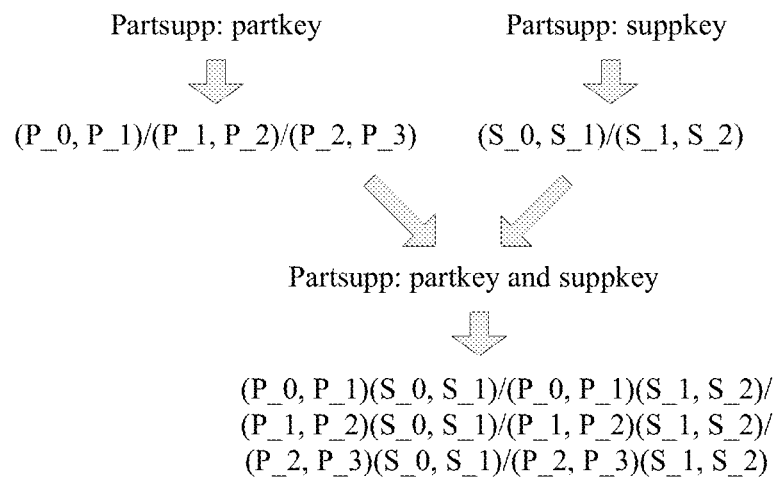
FIG. 5C is a schematic diagram of partitions of another multidimensional dimensional table according to an embodiment of the present invention.

For example, first, as shown in FIG. 4A and FIG. 5B, a dimensional table PARTSUPP is a two-dimensional table, and the two-dimensional table PARTSUPP is respectively associated with a one-dimensional table PART and a one-dimensional table SUPPLIER. It can be known from the foregoing method of this embodiment that a one-dimensional row replica partition and a one-dimensional column replica partition of the one-dimensional table PART both are (P_0, P_1)/(P_1, P_2)/(P_2, P_3), and a one-dimensional row replica partition and a one-dimensional column replica partition of the one-dimensional table SUPPLIER both are (S_0, S_1)/(S_1, S_2). Therefore, a one-dimensional row replica partition and a one-dimensional column replica partition that correspond to each join key of the dimensional table PARTSUPP may be directly obtained from the one-dimensional table PART and the one-dimensional table SUPPLIER. Alternatively, as shown in FIG. 4B and FIG. 5C, a dimensional table PARTSUPP is a two-dimensional table, the dimensional table PARTSUPP is associated with a fact table LINEITEM by using join keys PARTKEY and SUPPKEY, and the dimensional table PARTSUPP is not associated with a one-dimensional table. Therefore, one-dimensional partitioning may be performed based on the join key PARTKEY of the dimensional table PARTSUPP, to obtain a one-dimensional column replica partition and a one-dimensional row replica partition: (P_0, P_1)/(P_1, P_2)/(P_2, P_3). Similarly, one-dimensional partitioning may be performed based on the join key SUPPKEY, to obtain a one-dimensional column replica partition and a one-dimensional row replica partition: (S_0, S_1)/(S_1, S_2).

Then, the one-dimensional column replica partition (P_0, P_1)/(P_1, P_2)/(P_2, P_3) and the one-dimensional column replica partition (S_0, S_1)/(S_1, S_2) are combined, to obtain a multidimensional column replica partition (P_0, P_1)(S_0, S_1)/(P_0, P_1)(S_1, S_2)/(P_1, P_2)(S_0, S_1)/(P_1, P_2)(S_1, S_2)/(P_2, P_3)(S_0, S_1)/(P_2, P_3)(S_1, S_2) of the dimensional table PARTSUPP. Finally, the one-dimensional row replica partition corresponding to the join key PARTKEY or the join key SUPPKEY may be selected as a one-dimensional row replica partition of the dimensional table PARTSUPP.

When the data table is a fact table, a one-dimensional column replica partition of a one-dimensional table that is associated with the fact table and/or a multidimensional column replica partition of a multidimensional table that is associated with the fact table is obtained. Another field other than the join key is selected from the fact table as a partition key, and one-dimensional partitioning is performed on column replica space and a row replica space of the fact table based on the partition key, to obtain a one-dimensional column replica partition and a one-dimensional row replica partition. A multidimensional column replica partition of the fact table is obtained by means of combination according to the one-dimensional column replica partition corresponding to the partition key, and the one-dimensional column replica partition of the one-dimensional dimensional table that is associated with the fact table and/or the multidimensional column replica partition of the multidimensional dimensional table that is associated with the fact table. One-dimensional partitioning is performed on the one-dimensional row replica partition corresponding to the partition key, to obtain a one-dimensional row replica partition of the fact table.

Figure 5D:
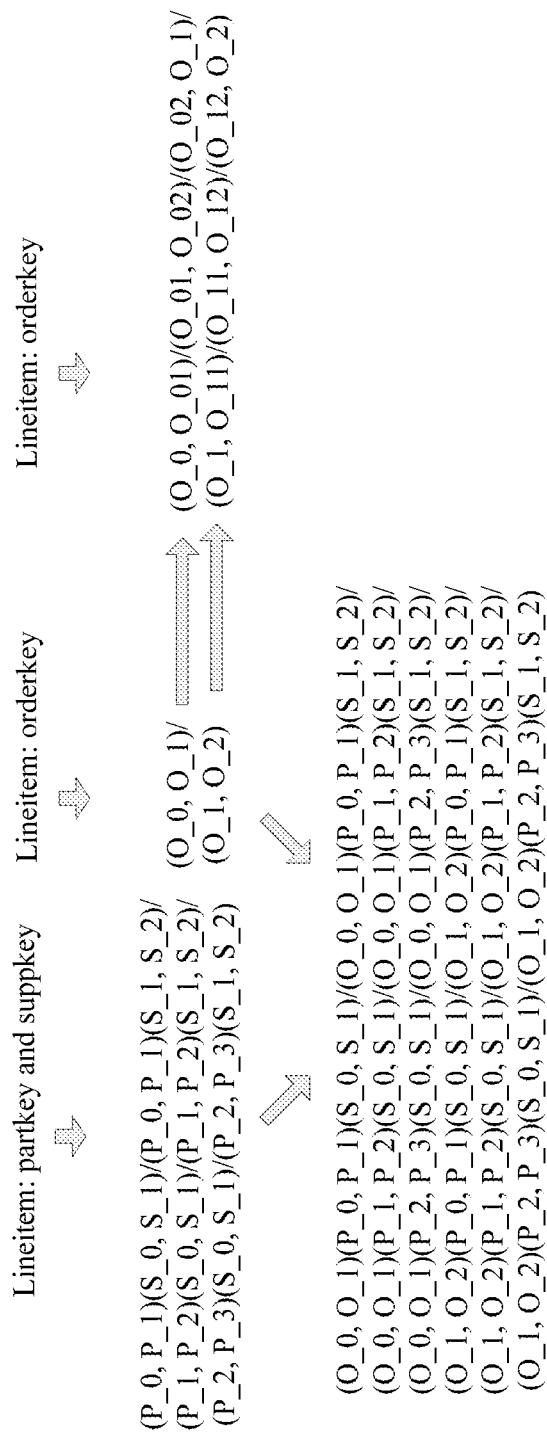
FIG. 5D is a schematic diagram of partitions of a fact table according to an embodiment of the present invention.

For example, as shown in FIG. 4A and FIG. 5D, a multidimensional column replica partition (P_0, P_1)(S_0, S_1)/(P_0, P_1)(S_1, S_2)/(P_1, P_2)(S_0, S_1)/(P_1, P_2)(S_1, S_2)/(P_2, P_3)(S_0, S_1)/(P_2, P_3)(S_1, S_2) of a dimensional table PARTSUPP that is associated with a fact table LINEITEM may be first obtained. Then, ORDERKEY of the fact table LINEITEM is used as a partition key, and one-dimensional partitioning is performed on column replica space and a row replica space of the fact table LINEITEM based on the partition key ORDERKEY, to obtain a one-dimensional column replica partition (O_0, O_1)/(O_1, O_2) and a one-dimensional row replica partition (O_0, O_1)/(O_1, O_2). At last, the multidimensional column replica partition (P_0, P_1)(S_0, S_1)/(P_0, P_1)(S_1, S_2)/(P_1, P_2)(S_0, S_1)/(P_1, P_2)(S_1, S_2)/(P_2, P_3)(S_0, S_1)/(P_2, P_3)(S_1, S_2) and the one-dimensional column replica partition (O_0, O_1)/(O_1, O_2) are combined, to obtain a multidimensional column replica partition of the fact table shown in FIG. 5D, and the one-dimensional row replica partition (O_0, O_1)/(O_1, O_2) is further partitioned, to obtain a one-dimensional row replica partition (O_0, O_01)/(O_01, O_02)/(O_02, O_1)/(O_1, O_11)/(O_11, O_12)/(O_12, O_2) of the fact table.

In this embodiment of the present invention, a type and a join key of each data table in the table group are first determined, where the type of the data table includes a one-dimensional table, a multidimensional table, or a fact table; and then one-dimensional partitioning is performed on row replica space of each data table in the table group, and one-dimensional or multidimensional partitioning is performed on column replica space of the data table according to the type of the data table and based on the join key of the data table. Therefore, different partitioning management methods are applied to data tables of different types and different dimensions, so that data processing mechanisms of OLTP and OLAP are efficiently implemented in a system, and resource consumption is reduced.

Figure 6:
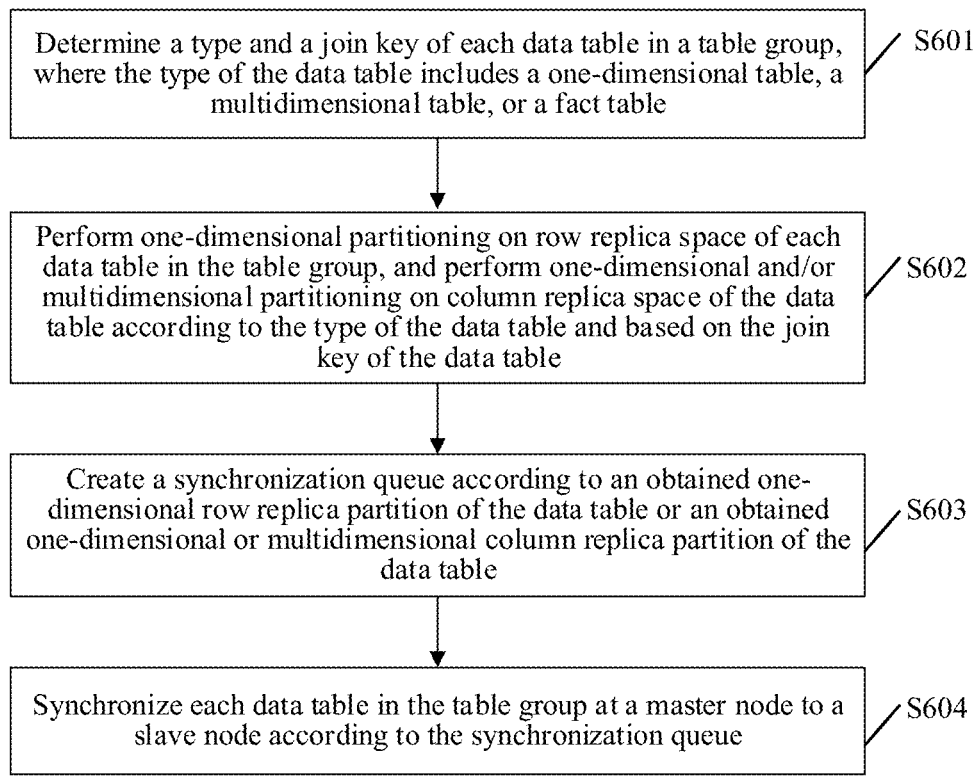
FIG. 6 is a schematic flowchart of a data table partitioning management method according to a second embodiment of the present invention.

Referring to FIG. 6, FIG. 6 is a schematic flowchart of a data table partitioning management method according to a second embodiment of the present invention. This embodiment of the present invention may be executed by a management node in a database cluster. As shown in the figure, the method in this embodiment of the present invention includes the following steps.

S601: Determine a type and a join key of each data table in a table group, where the type of the data table includes a one-dimensional dimensional table, a multidimensional dimensional table, or a fact table.

In an implementation, a table group includes one fact table and at least one one-dimensional table, the fact table is not a table having any dimension in the table group, each dimensional table is a dimensional table associated with the fact table, and a field that associates each dimensional table with the fact table is used as a join key between the fact table and the dimensional table. In a service scenario of managing multiple tables in a distributed database, tables stored in the database may be classified into a fact table and a dimensional table according to stored content. The fact table is an intersecting point of multiple dimensional tables, includes data describing a particular event in a service (for example, a bank transaction or product sale), and is used to store at least one fact record. Each fact record corresponds to a row in the fact table. One fact table may be associated with multiple dimensional tables, and the dimensional tables are used to analyze a fact. An entry in the dimensional table is used to describe data in the fact table, and records a dimensional attribute of the fact record in the fact table. For example, product sales may be analyzed according to a product type or a sale time. Therefore, a product dimensional table and a time dimensional table may be created first, and the product dimensional table and the time dimensional table are respectively aggregated into one table, to obtain a fact table. The fact table may include a product type, a sale time, a sale volume, or the like. In this embodiment, the fact table in the table group is associated with each dimensional table in the table group. A key connecting two data tables is generally referred to as a join key, and the fact table is associated with the dimensional table by using the join key.

As shown in FIG. 4A, a table group includes a dimensional table PART, a dimensional table SUPPLIER, a dimensional table PARTSUPP, and a fact table LINEITEM. The dimensional table PART, the dimensional table SUPPLIER, and the dimensional table PARTSUPP are all dimensional tables of the fact table LINEITEM. The dimensional table PART is associated with the dimensional table PARTSUPP and the fact table LINEITEM by using a join key PARTKEY. The dimensional table SUPPLIER is associated with the dimensional table PARTSUPP and the fact table LINEITEM by using a join key SUPPKEY. The dimensional table PART and the dimensional table SUPPLIER are both associated with the fact table by using only one join key, and are referred to as a one-dimensional dimensional table. The dimensional table PARTSUPP is associated with the fact table LINEITEM by using the join key PARTKEY and the join key SUPPKEY. Therefore, the dimensional table PARTSUPP is referred to as a two-dimensional table. It should be noted that a dimensional table in a table group includes, but is not limited to a one-dimensional table or a two-dimensional table, and may further include a three-dimensional table, a four-dimensional table, or the like.

S602: Perform one-dimensional partitioning on row replica space of each data table in the table group, and perform one-dimensional and/or multidimensional partitioning on column replica space of the data table according to the type of the data table and based on the join key of the data table.

In an implementation, when the data table is a one-dimensional table, one-dimensional partitioning is respectively performed on column replica space and row replica space of the one-dimensional dimensional table based on a single join key of the one-dimensional table, to obtain a one-dimensional column replica partition and a one-dimensional row replica partition of the one-dimensional table. An interval range of a one-dimensional row replica partition of a dimensional table is consistent with an interval range of a one-dimensional column replica partition of the dimensional table. Further, a quantity of nodes between row replica partitions may be selected according to a data volume, and a partition interval of each column replica partition is used as a logical node.

For example, as shown in FIG. 4A and FIG. 5A, a dimensional table PART and a dimensional table SUPPLIER are a one-dimensional dimensional table, a join key of the dimensional table PART is PARTKEY, and a join key of the dimensional table SUPPLIER is SUPPKEY. Therefore, one-dimensional partitioning is performed on the dimensional table PART based on the join key PARTKEY, to obtain both a one-dimensional row replica partition and a one-dimensional column replica partition of the dimensional table PART: (P_0, P_1)/(P_1, P_2)/(P_2, P_3). Similarly, one-dimensional partitioning is performed on the dimensional table SUPPLIER based on the join key SUPPKEY, to obtain both a one-dimensional row replica partition and a one-dimensional column replica partition of the dimensional table SUPPLIER: (S_0, S_1)/(S_1, S_2).

When the data table is a multidimensional table, a one-dimensional column replica partition and a one-dimensional row replica partition that correspond to each of multiple join keys of the multidimensional table are obtained. The multiple one-dimensional column replica partitions corresponding to the multiple join keys are combined, to obtain a multidimensional column replica partition of the multidimensional table. A one-dimensional row replica partition corresponding to one of the multiple join keys is selected as a one-dimensional row replica partition of the multidimensional table.

Further, when a one-dimensional table associated with the multidimensional table exists in the table group, a one-dimensional column replica partition and a one-dimensional row replica partition that correspond to a single join key of each associated one-dimensional table are obtained. Alternatively, when no one-dimensional table associated with the multidimensional table exists in the table group, one-dimensional portioning is respectively performed on column replica space and row replica space of the multidimensional table based on each of the multiple join keys of the multidimensional table, to obtain the one-dimensional column replica partition and the one-dimensional row replica partition that correspond to each of the join keys.

For example, first, as shown in FIG. 4A and FIG. 5B, a dimensional table PARTSUPP is a two-dimensional table, and the two-dimensional table PARTSUPP is respectively associated with a one-dimensional table PART and a one-dimensional table SUPPLIER. It can be known from the foregoing method of this embodiment that a one-dimensional row replica partition and a one-dimensional column replica partition of the one-dimensional table PART both are (P_0, P_1)/(P_1, P_2)/(P_2, P_3), and a one-dimensional row replica partition and a one-dimensional column replica partition of the one-dimensional table SUPPLIER both are (S_0, S_1)/(S_1, S_2). Therefore, a one-dimensional row replica partition and a one-dimensional column replica partition that correspond to each join key may be directly obtained from the one-dimensional table PART and the one-dimensional table SUPPLIER. Alternatively, as shown in FIG. 4B and FIG. 5C, a dimensional table PARTSUPP is a two-dimensional table, the dimensional table PARTSUPP is associated with a fact table LINEITEM by using join keys PARTKEY and SUPPKEY, and the dimensional table PARTSUPP is not associated with a one-dimensional dimensional table. Therefore, one-dimensional partitioning may be performed based on the join key PARTKEY of the dimensional table PARTSUPP, to obtain a one-dimensional column replica partition and a one-dimensional row replica partition: (P_0, P_1)/(P_1, P_2)/(P_2, P_3). Similarly, one-dimensional partitioning may be performed based on the join key SUPPKEY, to obtain a one-dimensional column replica partition and a one-dimensional row replica partition: (S_0, S_1)/(S_1, S_2).

Then, the one-dimensional column replica partition (P_0, P_1)/(P_1, P_2)/(P_2, P_3) and the one-dimensional column replica partition (S_0, S_1)/(S_1, S_2) are combined, to obtain a multidimensional column replica partition (P_0, P_1)(S_0, S_1)/(P_0, P_1)(S_1, S_2)/(P_1, P_2)(S_0, S_1)/(P_1, P_2)(S_1, S_2)/(P_2, P_3)(S_0, S_1)/(P_2, P_3)(S_1, S_2) of the dimensional table PARTSUPP. Finally, the one-dimensional row replica partition corresponding to the join key PARTKEY or the join key SUPPKEY may be selected as a one-dimensional row replica partition of the dimensional table PARTSUPP.

When the data table is a fact table, a one-dimensional column replica partition of a one-dimensional dimensional table that is associated with the fact table and/or a multidimensional column replica partition of a multidimensional dimensional table that is associated with the fact table is obtained. Another field other than the join key is selected from the fact table as a partition key, and one-dimensional partitioning is performed on column replica space and a row replica space of the fact table based on the partition key, to obtain a one-dimensional column replica partition and a one-dimensional row replica partition. A multidimensional column replica partition of the fact table is obtained by means of combination according to the one-dimensional column replica partition corresponding to the partition key, and the one-dimensional column replica partition of the one-dimensional dimensional table that is associated with the fact table and/or the multidimensional column replica partition of the multidimensional dimensional table that is associated with the fact table. One-dimensional partitioning is performed on the one-dimensional row replica partition corresponding to the partition key, to obtain a one-dimensional row replica partition of the fact table.

For example, as shown in FIG. 4A and FIG. 5D, a multidimensional column replica partition (P_0, P_1)(S_0, S_1)/(P_0, P_1)(S_1, S_2)/(P_1, P_2)(S_0, S_1)/(P_1, P_2)(S_1, S_2)/(P_2, P_3)(S_0, S_1)/(P_2, P_3)(S_1, S_2) of a dimensional table PARTSUPP that is associated with a fact table LINEITEM may be first obtained. Then, ORDERKEY of the fact table LINEITEM is used as a partition key, and one-dimensional partitioning is performed on column replica space and a row replica space of the fact table LINEITEM based on the partition key ORDERKEY, to obtain a one-dimensional column replica partition (O_0, O_1)/(O_1, O_2) and a one-dimensional row replica partition (O_0, O_1)/(O_1, O_2). At last, the multidimensional column replica partition (P_0, P_1)(S_0, S_1)/(P_0, P_1)(S_1, S_2)/(P_1, P_2)(S_0, S_1)/(P_1, P_2)(S_1, S_2)/(P_2, P_3)(S_0, S_1)/(P_2, P_3)(S_1, S_2) and the one-dimensional column replica partition (O_0, O_1)/(O_1, O_2) are combined, to obtain a multidimensional column replica partition of the fact table shown in FIG. 5C, and the one-dimensional row replica partition (O_0, O_1)/(O_1, O_2) is further partitioned, to obtain a one-dimensional row replica partition (O_0, O_01)/(O_01, O_02)/(O_02, O_1)/(O_1, O_11)/(O_11, O_12)/(O_12, O_2) of the fact table.

S603: Create a synchronization queue according to an obtained one-dimensional row replica partition of the data table or an obtained one-dimensional or multidimensional column replica partition of the data table.

In an implementation, when the data table is a one-dimensional table, a one-dimensional synchronization queue is created according to a one-dimensional row replica partition or a one-dimensional column replica partition of the one-dimensional table. Further, each partition in the one-dimensional row replica partition or the one-dimensional column replica partition of the one-dimensional dimensional table may be used as a member in the synchronization queue.

Figure 7A:
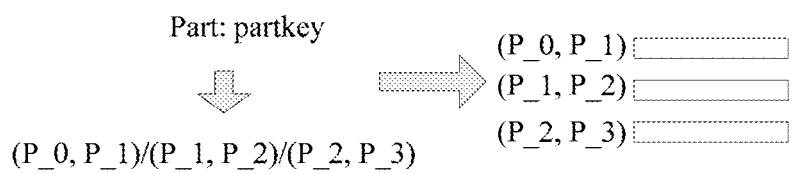
FIG. 7A is a schematic diagram of creating a synchronization queue of a one-dimensional dimensional table according to an embodiment of the present invention.

For example, as shown in FIG. 7A, a one-dimensional row replica partition and a one-dimensional column replica partition of a dimensional table PART both are (P_0, P_1)/(P_1, P_2)/(P_2, P_3), and a synchronization queue (P_0, P_1), (P_1, P_2), and (P_2, P_3) may be created.

Optionally, when the data table is a multidimensional dimensional table, a multidimensional synchronization queue is created according to a multidimensional column replica partition of the multidimensional dimensional table. Further, each partition in the multidimensional column replica partition of the multidimensional dimensional table may be used as a member in the synchronization queue.

Figure 7B:
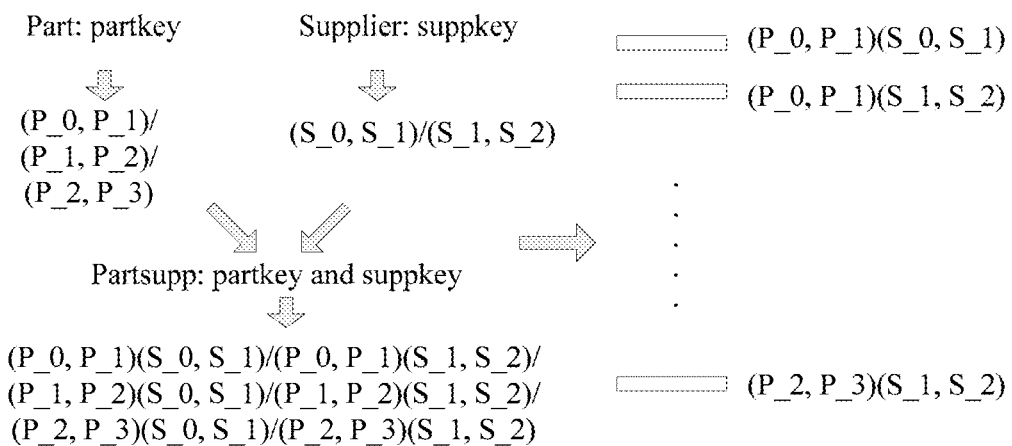
FIG. 7B is a schematic diagram of creating a synchronization queue of a multidimensional dimensional table according to an embodiment of the present invention.

For example, as shown in FIG. 7B, a multidimensional column replica partition of a dimensional table PARTSUPP is (P_0, P_1)(S_0, S_1)/(P_0, P_1)(S_1, S_2)/(P_1, P_2) (S_0, S_1)/(P_1, P_2)(S_1, S_2)/(P_2, P_3)(S_0, S_1)/ (P_2, P_3)(S_1, S_2), and a synchronization queue shown in FIG. 7B may be created.

Optionally, when the data table is a fact table, a multidimensional synchronization queue is created according to a one-dimensional column replica partition of a one-dimensional table that is associated with the fact table and/or a multidimensional column replica partition of a multidimensional dimensional table that is associated with the fact table, and a one-dimensional row replica partition of the fact table. Further, each partition may be obtained by combining the one-dimensional column replica partition of the one-dimensional table that is associated with the fact table and/or the multidimensional column replica partition of the multidimensional table that is associated with the fact table, and the one-dimensional row replica partition of the fact table, and may be used as a member in the synchronization queue.

For example, as shown in FIG. 7C, a multidimensional column replica partition of a two-dimensional dimensional table PARTSUPP that is associated with the fact table is (P_0, P_1)(S_0, S_1)/(P_0, P_1)(S_1, S_2)/(P_1, P_2)(S_0, S_1)/(P_1, P_2)(S_1, S_2)/(P_2, P_3)(S_0, S_1)/(P_2, P_3) (S_1, S_2), a one-dimensional row replica partition of the fact table is (O_0, O_01)/(O_01, O_02)/(O_02, O_1)/(O_1, O_11)/(O_11, O_12)/(O_12, O_2), and a synchronization queue shown in FIG. 7C is obtained by means of combination.

S604: Synchronize each data table in the table group at a master node to a slave node according to the synchronization queue.

Figure 9:
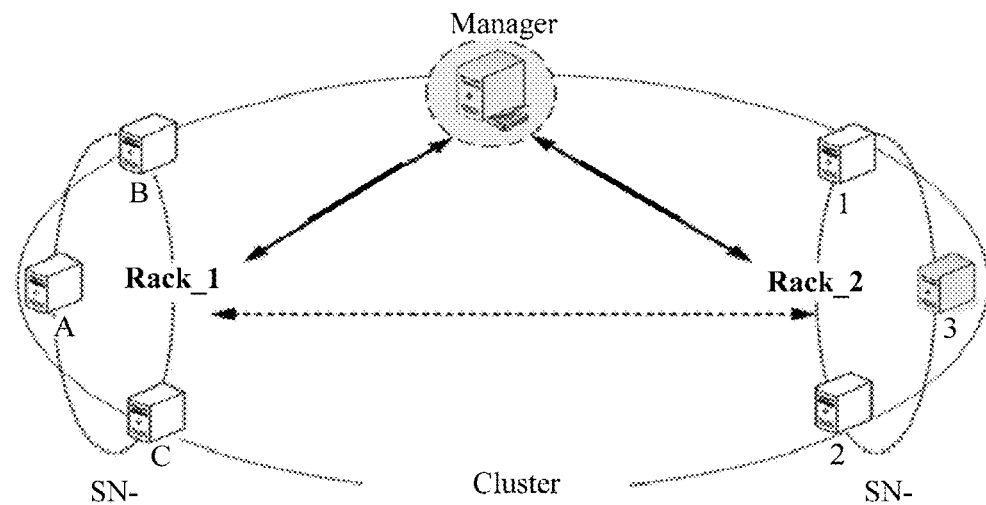
FIG. 9 is a schematic structural diagram of a network of a database system according to an embodiment of the present invention.

In an implementation, as shown in FIG. 9, a database cluster includes a manager mode and several cluster nodes. The cluster node is a general name of a master node (master node) and a slave node (slave node). The manager node is responsible for managing a table group of a system, and is responsible for updating and synchronizing a change of global routing. The master node includes a master node of a one-dimensional row replica and a master node of a one-dimensional column replica. The table group may be sent, by using the master node of the one-dimensional row replica, to the slave node for synchronization. Further, a data synchronization request is initiated to the slave node by using the master node of the one-dimensional row replica. After the slave node returns a response for answering, data tables in the table group are respectively synchronized to row replica space and column replica space of the slave node.

In this embodiment of the present invention, a type and a join key of each data table in the table group are first determined, where the type of the data table includes a one-dimensional table, a multidimensional table, or a fact table; and then one-dimensional partitioning is performed on row replica space of each data table in the table group, and one-dimensional or multidimensional partitioning is performed on column replica space of the data table according to the type of the data table and based on the join key of the data table. Therefore, different partitioning management methods are applied to data tables of different types and different dimensions, so that data processing mechanisms of OLTP and OLAP are efficiently implemented in a system, and resource consumption is reduced.

Figure 8:
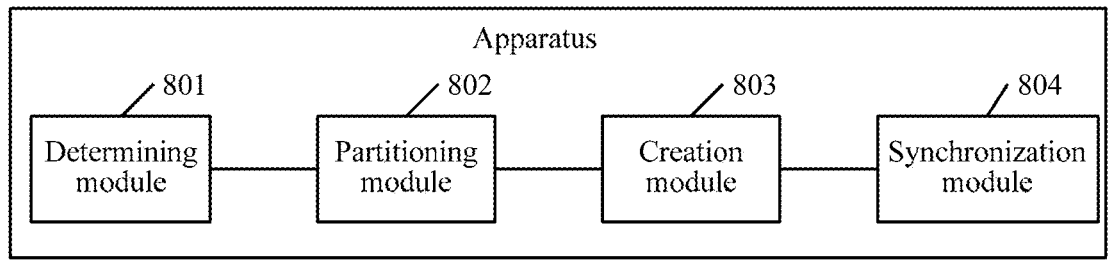
FIG. 8 is a schematic structural diagram of a data table partitioning management apparatus according to an embodiment of the present invention.

Referring to FIG. 8, FIG. 8 is a schematic structural diagram of a data table partitioning management apparatus according to an embodiment of the present invention. As shown in the figure, the apparatus in this embodiment of the present invention includes:

a determining module 801, configured to determine a type and a join key of each data table in the table group, where the type of the data table includes a one-dimensional dimensional table, a multidimensional dimensional table, or a fact table.

In an implementation, a table group includes one fact table and at least one one-dimensional table, the fact table is not a table having any dimension in the table group, each dimensional table is a dimensional table associated with the fact table, and a field that associates each dimensional table with the fact table is used as a join key between the fact table and the dimensional table. In a service scenario of managing multiple tables in a distributed database, tables stored in the database may be classified into a fact table and a dimensional table according to stored content. The fact table is an intersecting point of multiple dimensional tables, includes data describing a particular event in a service (for example, a bank transaction or product sale), and is used to store at least one fact record. Each fact record corresponds to a row in the fact table. One fact table may be associated with multiple dimensional tables, and the dimensional tables are used to analyze a fact. An entry in the dimensional table is used to describe data in the fact table, and records a dimensional attribute of the fact record in the fact table. For example, product sales may be analyzed according to a product type or a sale time. Therefore, a product dimensional table and a time dimensional table may be created first, and the product dimensional table and the time dimensional table are respectively aggregated into one table, to obtain a fact table. The fact table may include a product type, a sale time, a sale volume, or the like. In this embodiment, the fact table in the table group is associated with each dimensional table in the table group. A key connecting two data tables is generally referred to as a join key, and the fact table is associated with the dimensional table by using the join key.

As shown in FIG. 4A, a table group includes a dimensional table PART, a dimensional table SUPPLIER, a dimensional table PARTSUPP, and a fact table LINEITEM. The dimensional table PART, the dimensional table SUPPLIER, and the dimensional table PARTSUPP are all dimensional tables of the fact table LINEITEM. The dimensional table PART is associated with the dimensional table PARTSUPP and the fact table LINEITEM by using a join key PARTKEY. The dimensional table SUPPLIER is associated with the dimensional table PARTSUPP and the fact table LINEITEM by using a join key SUPPKEY. The dimensional table PART and the dimensional table SUPPLIER are both associated with the fact table by using only one join key, and are referred to as a one-dimensional dimensional table. The dimensional table PARTSUPP is associated with the fact table LINEITEM by using the join key PARTKEY and the join key SUPPKEY. Therefore, the dimensional table PARTSUPP is referred to as a two-dimensional table. It should be noted that a dimensional table in a table group includes, but is not limited to a one-dimensional table or a two-dimensional dimensional table, and may further include a three-dimensional table, a four-dimensional table, or the like.

The apparatus further includes a partitioning module 802, configured to: perform one-dimensional partitioning on row replica space of each data table in the table group, and perform one-dimensional and/or multidimensional partitioning on column replica space of the data table according to the type of the data table and based on the join key of the data table.

In an implementation, when the data table is a one-dimensional table, one-dimensional partitioning is respectively performed on column replica space and row replica space of the one-dimensional table based on a single join key of the one-dimensional table, to obtain a one-dimensional column replica partition and a one-dimensional row replica partition of the one-dimensional dimensional table. An interval range of a one-dimensional row replica partition of a dimensional table is consistent with an interval range of a one-dimensional column replica partition of the dimensional table. Further, a quantity of nodes between row replica partitions may be selected according to a data volume, and a partition interval of each column replica partition is used as a logical node.

For example, as shown in FIG. 4A and FIG. 5A, a dimensional table PART and a dimensional table SUPPLIER are a one-dimensional table, a join key of the dimensional table PART is PARTKEY, and a join key of the dimensional table SUPPLIER is SUPPKEY. Therefore, one-dimensional partitioning is performed on the dimensional table PART based on the join key PARTKEY, to obtain both a one-dimensional row replica partition and a one-dimensional column replica partition of the dimensional table PART: (P_0, P_1)/(P_1, P_2)/(P_2, P_3). Similarly, one-dimensional partitioning is performed on the dimensional table SUPPLIER based on the join key SUPPKEY, to obtain both a one-dimensional row replica partition and a one-dimensional column replica partition of the dimensional table SUPPLIER: (S_0, S_1)/(S_1, S_2).

When the data table is a multidimensional dimensional table, a one-dimensional column replica partition and a one-dimensional row replica partition that correspond to each of multiple join keys of the multidimensional table are obtained. The multiple one-dimensional column replica partitions corresponding to the multiple join keys are combined, to obtain a multidimensional column replica partition of the multidimensional table. A one-dimensional row replica partition corresponding to one of the multiple join keys is selected as a one-dimensional row replica partition of the multidimensional dimensional table.

Further, when a one-dimensional table associated with the multidimensional table exists in the table group, a one-dimensional column replica partition and a one-dimensional row replica partition that correspond to a single join key of each associated one-dimensional table are obtained. Alternatively, when no one-dimensional table associated with the multidimensional table exists in the table group, one-dimensional portioning is respectively performed on column replica space and row replica space of the multidimensional table based on each of the multiple join keys of the multidimensional table, to obtain the one-dimensional column replica partition and the one-dimensional row replica partition that correspond to each of the join keys.

For example, first, as shown in FIG. 4A and FIG. 5B, a dimensional table PARTSUPP is a two-dimensional table, and the two-dimensional table PARTSUPP is respectively associated with a one-dimensional table PART and a one-dimensional table SUPPLIER. It can be known from the foregoing method of this embodiment that a one-dimensional row replica partition and a one-dimensional column replica partition of the one-dimensional table PART both are (P_0, P_1)/(P_1, P_2)/(P_2, P_3), and a one-dimensional row replica partition and a one-dimensional column replica partition of the one-dimensional dimensional table SUPPLIER both are (S_0, S_1)/(S_1, S_2). Therefore, a one-dimensional row replica partition and a one-dimensional column replica partition that correspond to each join key may be directly obtained from the one-dimensional dimensional table PART and the one-dimensional dimensional table SUPPLIER. Alternatively, as shown in FIG. 4B and FIG. 5C, a dimensional table PARTSUPP is a two-dimensional table, the dimensional table PARTSUPP is associated with a fact table LINEITEM by using join keys PARTKEY and SUPPKEY, and the dimensional table PARTSUPP is not associated with a one-dimensional table. Therefore, one-dimensional partitioning may be performed based on the join key PARTKEY of the dimensional table PARTSUPP, to obtain a one-dimensional column replica partition and a one-dimensional row replica partition: (P_0, P_1)/(P_1, P_2)/(P_2, P_3). Similarly, one-dimensional partitioning may be performed based on the join key SUPPKEY, to obtain a one-dimensional column replica partition and a one-dimensional row replica partition: (S_0, S_1)/(S_1, S_2).

Then, the one-dimensional column replica partition (P_0, P_1)/(P_1, P_2)/(P_2, P_3) and the one-dimensional column replica partition (S_0, S_1)/(S_1, S_2) are combined, to obtain a multidimensional column replica partition (P_0, P_1)(S_0, S_1)/(P_0, P_1)(S_1, S_2)/(P_1, P_2)(S_0, S_1)/(P_1, P_2)(S_1, S_2)/(P_2, P_3)(S_0, S_1)/(P_2, P_3)(S_1, S_2) of the dimensional table PARTSUPP. Finally, the one-dimensional row replica partition corresponding to the join key PARTKEY or the join key SUPPKEY may be selected as a one-dimensional row replica partition of the dimensional table PARTSUPP.

When the data table is a fact table, a one-dimensional column replica partition of a one-dimensional dimensional table that is associated with the fact table and/or a multidimensional column replica partition of a multidimensional dimensional table that is associated with the fact table is obtained. Another field other than the join key is selected from the fact table as a partition key, and one-dimensional partitioning is performed on column replica space and a row replica space of the fact table based on the partition key, to obtain a one-dimensional column replica partition and a one-dimensional row replica partition. A multidimensional column replica partition of the fact table is obtained by means of combination according to the one-dimensional column replica partition corresponding to the partition key, and the one-dimensional column replica partition of the one-dimensional table that is associated with the fact table and/or the multidimensional column replica partition of the multidimensional table that is associated with the fact table. One-dimensional partitioning is performed on the one-dimensional row replica partition corresponding to the partition key, to obtain a one-dimensional row replica partition of the fact table.

For example, as shown in FIG. 4A and FIG. 5D, a multidimensional column replica partition (P_0, P_1)(S_0, S_1)/(P_0, P_1)(S_1, S_2)/(P_1, P_2)(S_0, S_1)/(P_1, P_2)(S_1, S_2)/(P_2, P_3)(S_0, S_1)/(P_2, P_3)(S_1, S_2) of a dimensional table PARTSUPP that is associated with a fact table LINEITEM may be first obtained. Then, ORDERKEY of the fact table LINEITEM is used as a partition key, and one-dimensional partitioning is performed on column replica space and a row replica space of the fact table LINEITEM based on the partition key ORDERKEY, to obtain a one-dimensional column replica partition (O_0, O_1)/(O_1, O_2) and a one-dimensional row replica partition (O_0, O_1)/(O_1, O_2). At last, the multidimensional column replica partition (P_0, P_1)(S_0, S_1)/(P_0, P_1) (S_1, S_2)/(P_1, P_2)(S_0, S_1)/(P_1, P_2)(S_1, S_2)/ (P_2, P_3)(S_0, S_1)/(P_2, P_3)(S_1, S_2) and the one-dimensional column replica partition (O_0, O_1)/(O_1, O_2) are combined, to obtain a multidimensional column replica partition of the fact table shown in FIG. 5C, and the one-dimensional row replica partition (O_0, O_1)/(O_1, O_2) is further partitioned, to obtain a one-dimensional row replica partition (O_0, O_01)/(O_01, O_02)/(O_02, O_1)/ (O_1, O_11)/(O_11, O_12)/(O_12, O_2) of the fact table.

Optionally, as shown in FIG. 8, the apparatus may further include:

a creation module 803, configured to create a synchronization queue according to an obtained one-dimensional row replica partition of the data table or an obtained one-dimensional or multidimensional column replica partition of the data table.

In an implementation, when the data table is a one-dimensional dimensional table, a one-dimensional synchronization queue is created according to a one-dimensional row replica partition or a one-dimensional column replica partition of the one-dimensional dimensional table. Further, each partition in the one-dimensional row replica partition or the one-dimensional column replica partition of the one-dimensional dimensional table may be used as a member in the synchronization queue.

For example, as shown in FIG. 7A, a one-dimensional row replica partition and a one-dimensional column replica partition of a dimensional table PART both are (P_0, P_1)/ (P_1, P_2)/(P_2, P_3), and a synchronization queue (P_0, P_1), (P_1, P_2), and (P_2, P_3) may be created.

Optionally, when the data table is a multidimensional dimensional table, a multidimensional synchronization queue is created according to a multidimensional column replica partition of the multidimensional dimensional table. Further, each partition in the multidimensional column replica partition of the multidimensional dimensional table may be used as a member in the synchronization queue.

Figure 10:
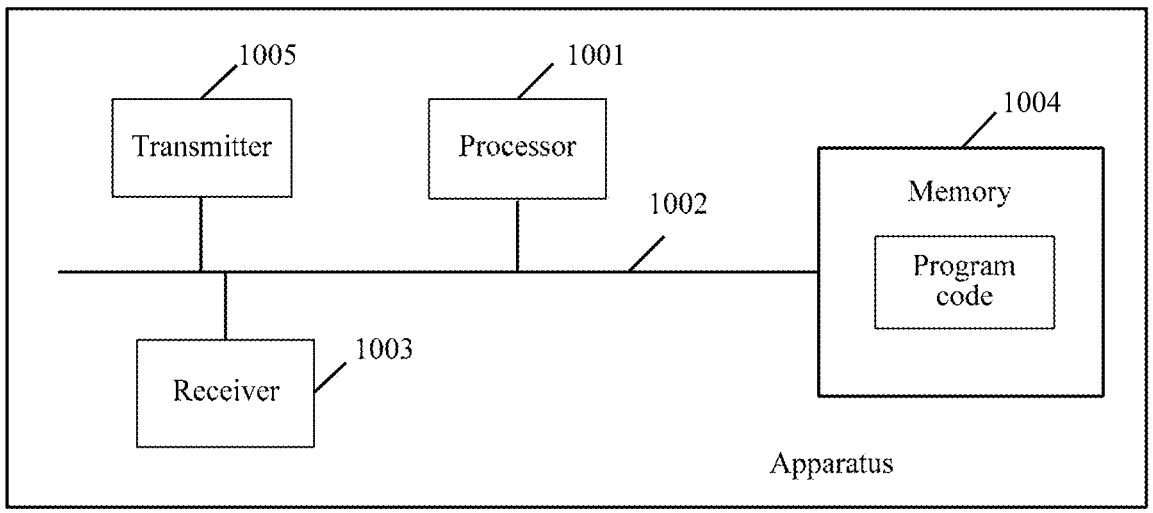
FIG. 10 is a schematic structural diagram of another data table partitioning management apparatus according to an embodiment of the present invention.

For example, as shown in FIG. 7B, a multidimensional column replica partition of a dimensional table PARTSUPP is (P_0, P_1)(S_0, S_1)/(P_0, P_1)(S_1, S_2)/(P_1, P_2) (S_0, S_1)/(P_1, P_2)(S_1, S_2)/(P_2, P_3)(S_0, S_1)/ (P_2, P_3)(S_1, S_2), and a synchronization queue shown in FIG. 10 may be created.

Optionally, when the data table is a fact table, a multidimensional synchronization queue is created according to a one-dimensional column replica partition of a one-dimensional dimensional table that is associated with the fact table and/or a multidimensional column replica partition of a multidimensional dimensional table that is associated with the fact table, and a one-dimensional row replica partition of the fact table. Further, each partition may be obtained by combining the one-dimensional column replica partition of the one-dimensional dimensional table that is associated with the fact table and/or the multidimensional column replica partition of the multidimensional dimensional table that is associated with the fact table, and the one-dimensional row replica partition of the fact table, and may be used as a member in the synchronization queue.

For example, as shown in FIG. 7C, a multidimensional column replica partition of a two-dimensional dimensional table PARTSUPP that is associated with the fact table is (P_0, P_1)(S_0, S_1)/(P_0, P_1)(S_1, S_2)/(P_1, P_2)(S_0, S_1)/(P_1, P_2)(S_1, S_2)/(P_2, P_3)(S_0, S_1)/(P_2, P_3) (S_1, S_2), a one-dimensional row replica partition of the fact table is (O_0, O_01)/(O_01, O_02)/(O_02, O_1)/(O_1, O_11)/(O_11, O_12)/(O_12, O_2), and a synchronization queue shown in FIG. 7C is obtained by means of combination.

The apparatus may further include a synchronization module 804, configured to synchronize each data table in the table group at a master node to a slave node according to the synchronization queue.

In an implementation, as shown in FIG. 9, a database cluster includes a manager mode and several cluster nodes. The cluster node is a general name of a master node (master node) and a slave node (slave node). The manager node is responsible for managing a table group of a system, and is responsible for updating and synchronizing a change of global routing. The master node includes a master node of a one-dimensional row replica and a master node of a one-dimensional column replica. The table group may be sent, by using the master node of the one-dimensional row replica, to the slave node for synchronization. Further, a data synchronization request is initiated to the slave node by using the master node of the one-dimensional row replica. After the slave node returns an answering response, data tables in the table group are respectively synchronized to row replica space and column replica space of the slave node.

In this embodiment of the present invention, a type and a join key of each data table in the table group are first determined, where the type of the data table includes a one-dimensional table, a multidimensional table, or a fact table; and then one-dimensional partitioning is performed on row replica space of each data table in the table group, and one-dimensional or multidimensional partitioning is performed on column replica space of the data table according to the type of the data table and based on the join key of the data table. Therefore, different partitioning management methods are applied to data tables of different types and different dimensions, so that data processing mechanisms of OLTP and OLAP are efficiently implemented in a system, and resource consumption is reduced.

FIG. 10 is a schematic structural diagram of a data table partitioning management apparatus according to an embodiment of the present invention. As shown in the figure, the apparatus may include: at least one processor 1001, for example, a CPU, at least one receiver 1003, at least one memory 1004, at least one transmitter 1005, and at least one communications bus 1002. The communications bus 1002 is configured to implement connection and communication between the components. The receiver 1003 and the transmitter 1005 of the apparatus in this embodiment of the present invention may be wired transmit ports or may be wireless devices, for example, include antenna apparatuses, configured to communicate signaling or data with another node device. The memory 1004 may be a high-speed RAM memory, or a non-volatile memory, such as at least one magnetic disk storage. Optionally, the memory 1004 may further be at least one storage apparatus that is located far away from the processor 1001. The memory 1004 stores a set of program code, and the processor 1001 is configured to call the program code stored in the memory, so that the apparatus executes the method in the foregoing implementation manners.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also appreciate that all the embodiments described in the specification are embodiments as an example, and the related actions and modules are not necessarily mandatory to the present disclosure.

In the foregoing embodiments, the descriptions of the embodiments have respective focuses. For a part that is not described in detail in an embodiment, refer to related descriptions in other embodiments.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

The foregoing describes in detail the data table partitioning management method, the related device, and the system that are provided in the embodiments of the present invention. In this specification, examples are used to describe the principle and implementation manners of the present disclosure, and the description of the embodiments is only intended to help understand the method and core idea of the present disclosure. In addition, a person of ordinary skill in the art may, based on the idea of the present disclosure, make modifications with respect to the implementation manners and the application scope. Therefore, the content of this specification shall not be construed as a limitation to the present disclosure.

What is claimed is:

1. A data table partitioning management method comprising:
   determining a type and a join key of each data table in a table group, wherein:
      the table group comprises a fact table and dimensional tables including a one-dimensional table, and a multidimensional table, wherein
         the fact table is a table having no dimension in the table group;
         each dimensional table in the table group is associated with the fact table;
         the join key is a field that associates each dimensional table with the fact table; and
         the type of the data table comprises one or more of a one-dimensional table, a multidimensional table, and a fact table;
   performing, based on the type of the data table and on the join key of the data table, one-dimensional partitioning on row replica space of each data table in the table group and one-dimensional partitioning and/or multidimensional partitioning on column replica space of the data table;
   creating a synchronization queue according to:
      an obtained one-dimensional row replica partition of the data table;
      an obtained one-dimensional column replica partition of the data table; and
      an obtained multidimensional column replica partition of the data table; and
   synchronizing each data table in the table group at a master node to a slave node according to the synchronization queue.

2. The method according to claim 1, wherein performing, based on the type of the data table and on the join key of the data table, one-dimensional partitioning on row replica space of each data table in the table group and one-dimensional partitioning and/or multidimensional partitioning on column replica space of the data table comprises:
   determining that a data table in the table group is a one-dimensional table; and
   performing one-dimensional partitioning on column replica space and row replica space of the one-dimensional table based on a single join key of the one-dimensional table to obtain a one-dimensional column replica partition and a one-dimensional row replica partition of the one-dimensional table.

3. The method according to claim 2, wherein performing, based on the type of the data table and on the join key of the data table, one-dimensional partitioning on row replica space of each data table in the table group and one-dimensional partitioning and/or multidimensional partitioning on column replica space of the data table comprises:
   determining that a data table in the table group is a multidimensional table;
   obtaining a one-dimensional column replica partition and a one-dimensional row replica partition that correspond to each of multiple join keys of the multidimensional dimensional table;
   combining the multiple one-dimensional column replica partitions corresponding to the multiple join keys to obtain a multidimensional column replica partition of the multidimensional table; and
   selecting a one-dimensional row replica partition corresponding to one of the multiple join keys as a one-dimensional row replica partition of the multidimensional table.

4. The method according to claim 3, wherein performing, based on the type of the data table and on the join key of the data table, one-dimensional partitioning on row replica space of each data table in the table group and one-dimensional partitioning and/or multidimensional partitioning on column replica space of the data table comprises:
   determining that a data table in the table group is a fact table;
   obtaining one or more of:
      a one-dimensional column replica partition of a one-dimensional dimensional table that is associated with the fact table and
      a multidimensional column replica partition of a multidimensional dimensional table that is associated with the fact table;
   selecting a field other than the join key from the fact table as a partition key;
   performing one-dimensional partitioning on column replica space and a row replica space of the fact table based on the partition key to obtain a one-dimensional column replica partition and a one-dimensional row replica partition;
   obtaining a multidimensional column replica partition of the fact table by combining one or more of:
      the one-dimensional column replica partition of the one-dimensional dimensional table that is associated with the fact table; and
      the multidimensional column replica partition of the multidimensional dimensional table that is associated with the fact table,
      according to the one-dimensional column replica partition corresponding to the partition key; and
   performing one-dimensional partitioning on the one-dimensional row replica partition corresponding to the partition key to obtain a one-dimensional row replica partition of the fact table.

5. The method according to claim 3, wherein obtaining the one-dimensional column replica partition and the one-dimensional row replica partition that correspond to each of multiple join keys of the multidimensional dimensional table comprises:
    determining that a one-dimensional dimensional table associated with the multidimensional table exists in the table group; and
    obtaining a one-dimensional column replica partition and a one-dimensional row replica partition that correspond to a single join key of each associated one-dimensional table.

6. The method according to claim 3, wherein obtaining the one-dimensional column replica partition and the one-dimensional row replica partition that correspond to each of multiple join keys of the multidimensional dimensional table comprises:
    determining that no one-dimensional table associated with the multidimensional table exists in the table group; and
    performing one-dimensional partitioning on column replica space and row replica space of the multidimensional table based on each of the multiple join keys of the multidimensional table to obtain the one-dimensional column replica partition and the one-dimensional row replica partition that correspond to each of the join keys.

7. The method according to claim 1, wherein creating the synchronization queue according to:
    the obtained one-dimensional row replica partition of the data table;
    the obtained one-dimensional column replica partition of the data table; and
    the obtained multidimensional column replica partition of the data table comprises:
        determining that a data table in the table group is a one-dimensional table; and
        creating a one-dimensional synchronization queue according to:
            a one-dimensional row replica partition; and
            a one-dimensional column replica partition of the one-dimensional table.

8. The method according to claim 1, wherein creating the synchronization queue according to:
    the obtained one-dimensional row replica partition of the data table;
    the obtained one-dimensional column replica partition of the data table; and
    the obtained multidimensional column replica partition of the data table comprises:
        determining that a data table in the table group is a multidimensional table; and
        creating a multidimensional synchronization queue according to a multidimensional column replica partition of the multidimensional table.

9. The method according to claim 1, wherein creating the synchronization queue according to:
    the obtained one-dimensional row replica partition of the data table;
    the obtained one-dimensional column replica partition of the data table; and
    the obtained multidimensional column replica partition of the data table comprises:
        determining that a data table in the table group is a fact table; and
        creating a multidimensional synchronization queue according to a one-dimensional row replica partition of the fact table and any one of:
            a one-dimensional column replica partition of a one-dimensional table that is associated with the fact table; and
            a multidimensional column replica partition of a multidimensional table that is associated with the fact table.

10. A data table partitioning management apparatus comprising:
    a network interface;
    a memory; and
    a processor, wherein the memory has a set of program code stored thereon, that when processed by the processor, cause the processor to:
        determine a type and a join key of each data table in a table group, wherein:
            the table group comprises a fact table, a one-dimensional table, and a multidimensional;
            the fact table is a table having no dimension in the table group;
            each dimensional table in the table group is associated with the fact table;
            the join key is a field that associates each dimensional table with the fact table; and
            the type of the data table comprises one or more of a one-dimensional table, a multidimensional table, and a fact table;
        perform, based on the type of the data table and on the join key of the data table, one-dimensional partitioning on row replica space of each data table in the table group and one-dimensional partitioning and/or multidimensional partitioning on column replica space of the data table;
        create a synchronization queue according to:
            an obtained one-dimensional row replica partition of the data table;
            an obtained one-dimensional column replica partition of the data table; and
            an obtained multidimensional column replica partition of the data table; and
        synchronize each data table in the table group at a master node to a slave node according to the synchronization queue.

11. The apparatus according to claim 10, wherein the processor is configured to:
    determine that a data table in the table group is a one-dimensional table; and
    perform one-dimensional partitioning on column replica space and row replica space of the one-dimensional table based on a single join key of the one-dimensional table to obtain a one-dimensional column replica partition and a one-dimensional row replica partition of the one-dimensional table.

12. The apparatus according to claim 11, wherein the processor is configured to:
    determine that a data table in the table group is a multidimensional table;
    obtain a one-dimensional column replica partition and a one-dimensional row replica partition that correspond to each of multiple join keys of the multidimensional table;
    combine the multiple one-dimensional column replica partitions corresponding to the multiple join keys to obtain a multidimensional column replica partition of the multidimensional table; and select a one-dimensional row replica partition corresponding to one of the multiple join keys as a one-dimensional row replica partition of the multidimensional table.

13. The apparatus according to claim 12, wherein the processor is configured to:
    determine that a data table in the table group is a fact table;
    obtain one or more of:
        a one-dimensional column replica partition of a one-dimensional table that is associated with the fact table; and
        a multidimensional column replica partition of a multidimensional table that is associated with the fact table;
    select a field other than the join key from the fact table as a partition key;
    perform one-dimensional partitioning on column replica space and a row replica space of the fact table based on the partition key to obtain a one-dimensional column replica partition and a one-dimensional row replica partition;
    obtain a multidimensional column replica partition of the fact table by combining one or more of:
        the one-dimensional column replica partition of the one-dimensional table that is associated with the fact table; and
        the multidimensional column replica partition of the multidimensional table that is associated with the fact table,
        according to the one-dimensional column replica partition corresponding to the partition key; and
    perform one-dimensional partitioning on the one-dimensional row replica partition corresponding to the partition key to obtain a one-dimensional row replica partition of the fact table.

14. The apparatus according to claim 12, wherein the processor is configured to:
    determine that a one-dimensional dimensional table associated with the multidimensional table exists in the table group; and
    obtain a one-dimensional column replica partition and a one-dimensional row replica partition that correspond to a single join key of each associated one-dimensional table.

15. The apparatus according to claim 12, wherein the processor is configured to:
    determine that no one-dimensional table associated with the multidimensional table exists in the table group; and
    perform one-dimensional partitioning on column replica space and row replica space of the multidimensional table based on each of the multiple join keys of the multidimensional table to obtain the one-dimensional column replica partition and the one-dimensional row replica partition that correspond to each of the join keys.

16. The apparatus according to claim 10, wherein the processor is configured to:
    determine that a data table in the table group is a one-dimensional table; and
    create a one-dimensional synchronization queue according to a one-dimensional row replica partition and a one-dimensional column replica partition of the one-dimensional table.

17. The apparatus according to claim 10, wherein the processor is configured to:
    determine that a data table in the table group is a multidimensional table; and
    create a multidimensional synchronization queue according to a multidimensional column replica partition of the multidimensional table.

18. The apparatus according to claim 10, wherein the processor is configured to:
    determine that a data table in the table group is a fact table; and
    create a multidimensional synchronization queue according to a one-dimensional row replica partition of the fact table and any one of:
        a one-dimensional column replica partition of a one-dimensional table that is associated with the fact table; and
        a multidimensional column replica partition of a multidimensional table that is associated with the fact table.

* * * * *